(12) United States Patent
Durg et al.

(10) Patent No.: US 6,212,304 B1
(45) Date of Patent: Apr. 3, 2001

(54) METHOD AND APPARATUS FOR IMAGING PROCESSING

(75) Inventors: Ajaya V. Durg, Sunnyvale; Oleg Rashkovskiy, Cupertino, both of CA (US)

(73) Assignee: Intel Corp., Santa Clara, CA (US)

(*) Notice: Subject to any disclaimer, the term of this patent is extended or adjusted under 35 U.S.C. 154(b) by 0 days.

(21) Appl. No.: 09/110,345

(22) Filed: Jul. 6, 1998

(51) Int. Cl.$^7$ .................................................. G06K 9/00
(52) U.S. Cl. ........................................... 382/254; 382/270
(58) Field of Search ................................... 382/254–259, 382/266–269, 270

(56) References Cited

U.S. PATENT DOCUMENTS

| | | | |
|---|---|---|---|
| 3,761,876 | * 9/1973 | Flaherty et al. | 340/143.6 MA |
| 4,124,870 | * 11/1978 | Schatz et al. | 358/260 |
| 5,294,989 | 3/1994 | Moore et al. | 348/241 |
| 5,335,292 | * 8/1994 | Lovelady et al. | 382/17 |
| 5,452,107 | * 9/1995 | Koike | 358/468 |
| 5,455,873 | * 10/1995 | Cameron | 382/270 |
| 5,594,816 | 1/1997 | Kaplan et al. | 382/275 |

OTHER PUBLICATIONS

"A Multiscale Retinex for Bridging the Gap Between Color Images and the Human Observation of Scenes"; Danial Jobson, Zia–ur Rahman, and Glenn A. Woodell; IEEE Transactions on Image Processing, vol. 6, No. 7, Jul. 1997.

"Spatial Filtering in Tone Reproduction and Vision"; Andrew J. Moore; California Institute of Technology Pasadena, California 1992.

"A Multiscale Retinex for Color Rendition and Dynamic Range Compression"; Zia–ur Rahman, Daniel J. Jobson and Glenn A Woodell; SPIE vol. 2847.

Properties of a Center/Surround Retinex: Part 1–Signal Processing Desing; Zia–ur Rahman; NASA Contrator Report 198194, Aug., 1995.

Properties of a Center/Surround Retinex: Part 2–Surround Design; Daniel J. Jobson and Glenn A Woodell; NASA Contrator Report 110188, Aug. 1995.

\* cited by examiner

Primary Examiner—Thomas D. Lee
Assistant Examiner—Stephen Brinich
(74) Attorney, Agent, or Firm—Kenyon & Kenyon

(57) ABSTRACT

A method and apparatus for processing an image is described. A first area having a first value is selected. A second value for a second area surrounding the first area is determined. The first and second values are compared with a predetermined threshold. The first value is transformed according to the comparison.

11 Claims, 3 Drawing Sheets

METHOD AND APPARATUS FOR IMAGING PROCESSING

FIELD OF THE INVENTION

The invention relates to image processing in general. More particularly, the invention relates to a method and apparatus for increasing details in an image while maintaining brightness and color constancy.

BACKGROUND OF THE INVENTION

The superior quality provided by digital technologies has created a huge demand for digital products in general. Part of this digital revolution is the increased popularity of digital images. It is now possible to use a digital camera to capture an image and reproduce the image on some sort of display media using a personal computer (PC) monitor or high resolution printer. It has even become common practice to incorporate digital images into "web pages" available over a network such as the Internet and World Wide Web, or to send a digital image to another PC via electronic mail.

At the heart of this digital image revolution are image processing systems. These systems process the captured digital image to enhance the clarity and details of the image using sophisticated image processing algorithms. The use of these algorithms result in images that are substantially more accurate and detailed than previously achieved using older analog methods.

There remains, however, a substantial difference between how an image is perceived by a person and an image captured and reproduced on a display medium. Despite the improvements gained by digital image processing systems, these systems are still incapable of reproducing an image with the same level of detail, color constancy, and lightness of an actual scene as the eye, brain and nervous system of a human. This is due in part because the human nervous system has a greater dynamic range compression than is available on current digital systems. Dynamic range compression refers to the ability to distinguish varying levels of light. The human eye has a dynamic range compression of approximately 1000:1, which means that the human eye can distinguish approximately 1000 levels of light variations. By way of contrast, digital image systems typically use only eight bits per pixel which allows for a dynamic range compression of only 255:1. As a result, a digital image reproduced as a photograph would have far less detail in the darker and brighter regions of the photograph as compared to the actual scene perceived by a viewer.

Many techniques have been developed to compensate for this lighting deficiency. These techniques can be separated into two broad categories: (1) power law or non-linear techniques ("non-linear techniques"); and (2) retinex techniques. Each have their respective limitations.

Non-linear techniques use a non-linear relationship to expand one portion of the dynamic range while compressing another. These techniques generally enhance details in the darker regions at the expense of detail in the brighter regions. For example, each pixel of a digital image is represented using eight bits, and therefore is assigned a luminance value somewhere in the range of 0 to 255, with 0 representing the lowest light level and 255 the highest. If a region is comprised of pixels having low light values, detail is lost since there is very little gradient between the light values for each pixel. For example, it is difficult for a viewer to look at a picture and distinguish between a pixel having a luminance value of 23 and a pixel having a luminance value of 25. To solve this problem, conventional image processing system utilize non-linear techniques to increase the luminance values for neighboring pixels, thereby creating a greater degree of contrast between the pixels. Thus, the pixel having the luminance value of 25 might be assigned a higher value such as 28 to create a greater contrast between it and the pixel having a value of 23.

One problem associated with these non-linear systems is that they provide greater distinctions between pixels regardless of what lightness value a pixel may have been originally assigned. This results in the brighter areas which already have a "washed-out" appearance to become even more washed-out. Although these techniques result in greater detail in the darker regions, they do so at the expense of the brighter areas of the digital image. Further, these methods suffer from contours and abrupt boundaries.

Retinex techniques are based on the work of Dr. Edwin H. Land. The fundamentals of Mr. Land's retinex techniques as well as several variations are described in a paper by A. Moore titled "Spatial Filtering in Tone Reproduction and Vision," PhD Thesis, California Institute of Technology, Pasadena, Calif., 1992, and D. J. Jobson, et al. in a paper titled "A Multi-Scale Retinex for Bridging the Gap Between Color Images and the Human Observation of Scenes," IEEE Transactions on Image Processing: Special Issue on Color Processing, July 1997. In essence, these techniques increase or decrease the luminance value for a pixel based on the luminance values of surrounding pixels. These techniques are particularly useful for enhancing boundaries between lighter and darker regions of an image. These techniques, however, are unsatisfactory for a number of reasons. For example, the Moore reference describes a technique that grays out large uniform zones in the image. With respect to the Jobson reference, the described technique allows a shift in color in some images and is computational intensive.

In view of the foregoing, it can be appreciated that a substantial need exists for an image processing method and apparatus that solves the above-discussed problems.

SUMMARY OF THE INVENTION

One embodiment of the invention comprises a method and apparatus for processing an image. A first area having a first value is selected. A second value for a second area surrounding the first area is determined. The first and second values are compared with a predetermined threshold. The first value is transformed according to the comparison.

DETAILED DESCRIPTION

One embodiment of the invention enhances details for a digital image while preserving brightness and color constancy. At a given point (e.g., pixel) in the image, a determination is made as to whether the surrounding pixels ("the surround") constitute a dark or light region of the image. If the surround is a dark region, the inverse of the surround is used to enhance the center of the surround. If the surround happens to be a light region, the center pixel is scaled with a linear transform in such a way that the inverse transform for the dark region and the linear transform for the light region meet at a common gray level.

Figure 1:
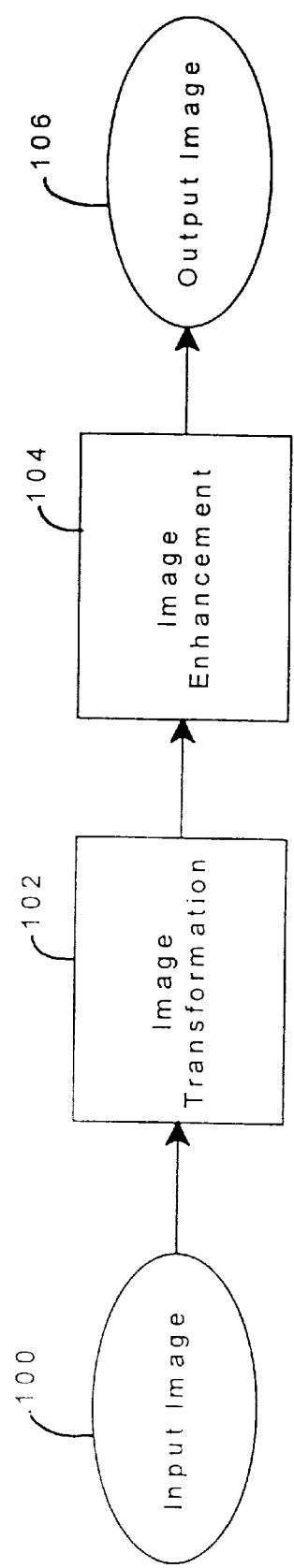
FIG. 1 is a block flow diagram of an image processing system suitable for practicing one embodiment of the present invention.

Referring now in detail to the drawings wherein like parts are designated by like reference numerals throughout, there is illustrated in FIG. 1 a block flow diagram of an image processing system suitable for practicing one embodiment of the present invention. An image is captured and digitized according to techniques well-known in the art at step 100. The digital image is represented by discrete areas referred to as pixels.

The digitized image is transformed to YUV space at step 102, with Y representing luminance, U a first color, and V a second color. In this embodiment of the invention, the transformation is made in accordance with International Telecommunications Union-Radio (ITU-R) Rec. 601-2 titled "Encoding Parameters of Digital Television for Studios," 1990. Each pixel is assigned a YUV value. The Y value controls the brightness for that particular pixel. Current systems typically utilize eight bits to represent the Y value due to bandwidth efficiency and memory design considerations. Therefore, conventional image processing systems assign each pixel a Y value somewhere in the range of 0 to 235, with 0 representing the darkest luminance and 235 representing the brightest luminance.

At step 104 image enhancement techniques are used to emphasize and sharpen image features for display. Enhancement methods operate in the spatial domain by manipulating the pixel data or in the frequency domain by modifying the spectral components. This embodiment of the invention operates in the spatial domain, and more particularly, applies a transform only on the luminance value Y. This embodiment of the invention enhances the details in the darker regions of the digitally recorded images without washing out the details at the brighter ends thereby making the digitally recorded images more realistic with respect to an actual viewer. Further, this embodiment of the invention further improves upon graying out of large uniform zones of color as occurs using conventional techniques, and also does not show color shift since it only operates on the Y plane. In addition, this embodiment of the invention is computational fast since it operates on the Y plane. The enhanced image is then outputted at step 106.

Figure 2:
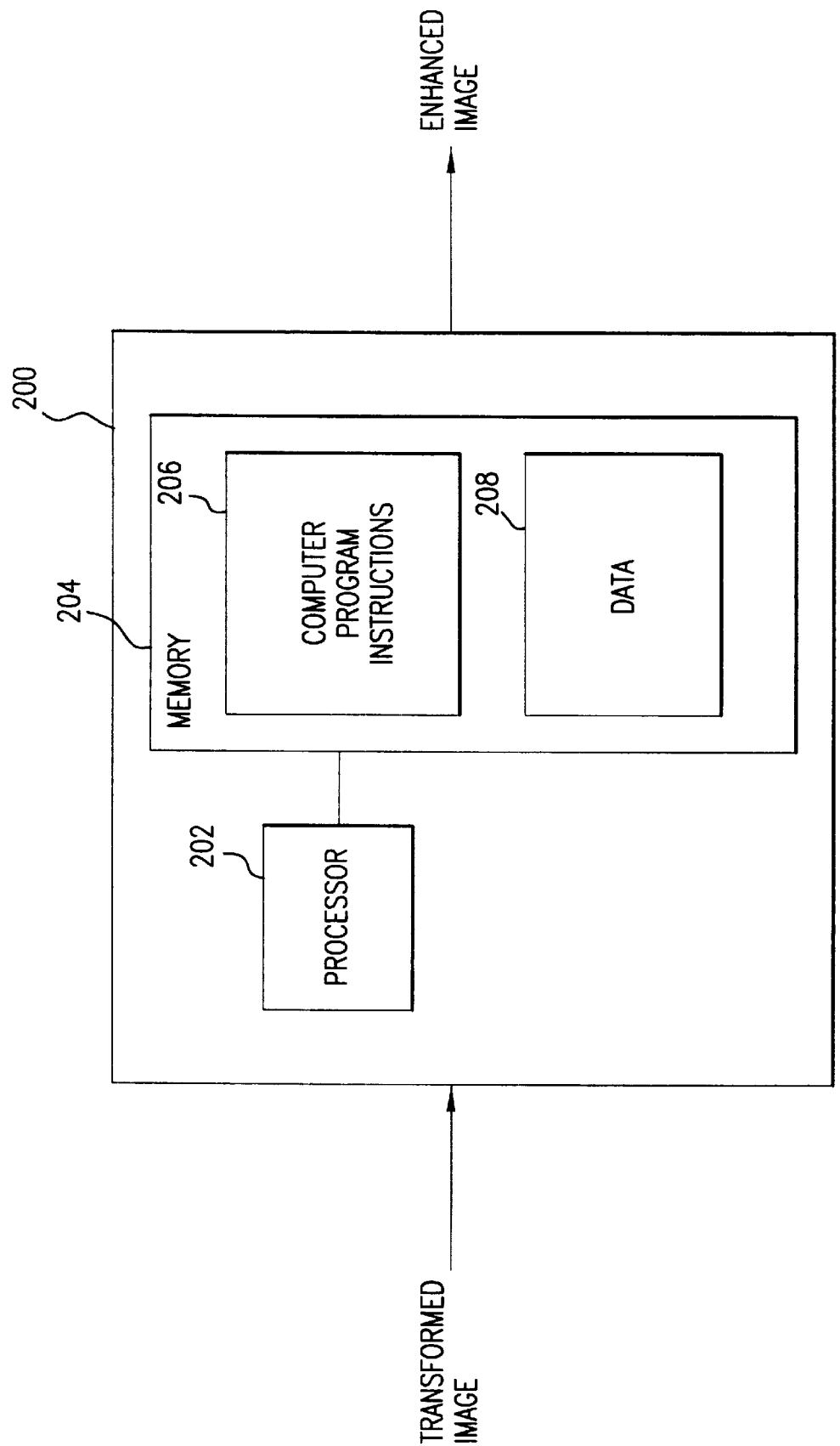
FIG. 2 is a block diagram of an image enhancer in accordance with one embodiment of the invention.

FIG. 2 is a block diagram of an image enhancer in accordance with one embodiment of the invention. FIG. 2 shows image enhancer 200 comprising processor 202 and a memory 204. Memory 204 includes computer program instructions 206 and data 208 for implementing the main functionality for image enhancer 200.

The overall functioning of image enhancer 200 is controlled by processor 202, which operates under the control of executed computer program instructions that are stored in memory 204. Memory 204 comprises a computer readable storage device. For example, memory 204 may be any type computer readable storage device, such as random access memory (RAM), read only memory (ROM), programmable read only memory (PROM), erasable programmable read only memory (EPROM), electronically erasable programmable read only memory (EEPROM), magnetic storage media (i.e., a magnetic disk), optical storage media (i.e., a CD-ROM or Digital Video Disc), and so forth. Further, image enhancer 200 may contain various combinations of machine readable storage devices that are accessible by processor 202 and which are capable of storing a combination of computer program instructions and data.

Processor 202 includes any processor of sufficient processing power to perform the functionality found in image enhancer 200. Examples of processors suitable to practice the invention includes such processors as the Pentium®, Pentium® Pro, and Pentium® II microprocessors made by Intel Corporation.

Computer program instructions 206 and data 208 implement the main functionality for image enhancer 200. Although image enhancer 200 is described in terms of software in this embodiment of the invention, it can be appreciated that the functionality of image enhancer 200 may be implemented in hardware, software, or a combination of hardware and software, using well-known signal processing techniques.

Figure 3:
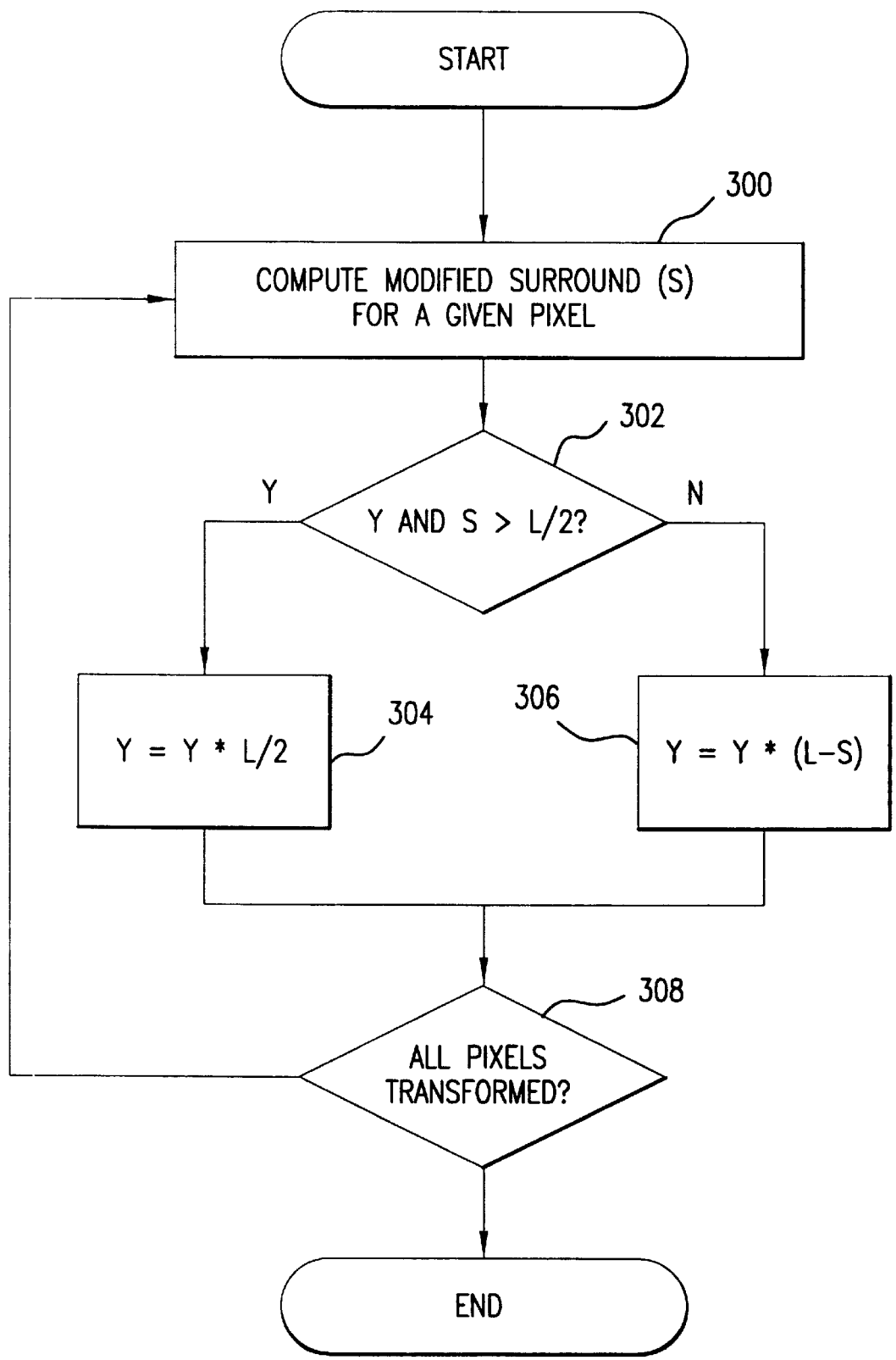
FIG. 3 is a block flow diagram of the steps performed by an image enhancer in accordance with one embodiment of the invention.

FIG. 3 is a block flow diagram of the steps performed by an image enhancer in accordance with one embodiment of the invention. At step 300, image enhancer 200 selects a first area or pixel having a luminance value Y, and computes a surround value S for a second area of pixels surrounding the first pixel. The surround S is computed using the following equation:

$$S(x, y) = \sum_{q=y-c}^{y+c} \sum_{p=x-c}^{x+c} Y'(p, q) * Ke^{-(p*p+q*q)/(c*c/4)}$$

The surround calculation uses the modified neighbor value Y'(p,q) as defined above, instead of the original neighbor value Y'(p,q). The constants alpha and beta are percentage values which control how much excursion in gray scale value is allowed for the neighbors I (p, q) from the gray scale value of the center Y(x, y) as allowable. Advantageous percentage values for alpha and beta are 50 and 150, respectively, for a neighborhood of c=15 pixels.

Once the surround S for a given pixel is computed, both Y and S for the given pixel are compared with a predetermined threshold at step 302. Y is then transformed from its initial value (e.g., a value between 0 and 235) to another value based on the results of the comparison. The transformation occurs as follows: if both Y and S are greater than the predetermined threshold at step 302, then Y is multiplied by the predetermined threshold at step 304; if both Y and S are not greater than the predetermined threshold at step 302, then Y is multiplied by the predetermined threshold minus S at step 306. Steps 302, 304 and 306 can be mathematically represented as Y'(x, y)=Y(x, y) * (L/2), if Y>L/2 and S>L/2, and otherwise as Y'(x, y)=Y(x, y) [* L-S(x, y)], where L=(Maximum+Minimum) value of the Y scale for a given image. At step 308 image enhancer 200 tests whether all pixels for the given image have been transformed, and if not passes control to step 300.

Multiplying a pixel with the inverse of its surround offers a superior non-linearity that has the effect of enhancing details at the dark end as the inverse makes dark values bright and bright values dark. The inverse surround enhancement reaches a peak value when the center pixel and its surround are equal to L/2, with L representing the maximum value plus the minimum value of the Y scale for a given image. Thus, in this embodiment of the invention the predetermined threshold is L/2.

The result of the inverse non-linearity enhances the bright end without bringing in washed-out effects that are introduced by conventional techniques. This embodiment of the invention offers added value for under exposed images in particular. An under exposed image can be detected and applied in real time by devising heuristics based on the lightness channel histogram.

This embodiment of the invention can be better understood in view of the following example. Table 1 reproduced below demonstrates values for a guassion mask, pixel luminance values, a surround for each value, the output of the transformation equations, and rescaled pixel luminance values:

TABLE 1

| Gaussian mask: mask = 15, gconst = 15.000000 | | | | |
|---|---|---|---|---|
| 0.000335 | 0.000562 | 0.000908 | 0.001416 | 0.002131 |
| 0.000562 | 0.00941 | 0.001520 | 0.002371 | 0.003569 |
| 0.000908 | 0.001520 | 0.002457 | 0.003832 | 0.005767 |
| 0.001416 | 0.002371 | 0.003832 | 0.005976 | 0.008995 |
| 0.002131 | 0.003569 | 0.005767 | 0.008995 | 0.013538 |

| Pixel | Orig | Surround | Equation Output | Rescaled to |
|---|---|---|---|---|
| 25,148 | 37 | 34.93 | 7994.53 | 72 |
| 150,199 | 69 | 63.58 | 12931.90 | 136 |
| 154,242 | 56 | 47.19 | 11413.49 | 116 |
| 190,214 | 90 | 89.28 | 14554.77 | 157 |
| 194,124 | 38 | 37.86 | 8099.16 | 73 |

(Rescaled with Max: 20629.95 Min: 3709.88 to 235 and 16 respectively)

It should be noted that the above values are for exemplary purposes only.

Although various embodiments are specifically illustrated and described herein, it will be appreciated that modifications and variations of the present invention are covered by the above teachings and within the purview of the appended claims without departing from the spirit and intended scope of the invention. For example, although a predetermined threshold for one embodiment of the invention is L/2, it car be appreciated that the predetermined threshold can be modified in view of specific design goals and still fall within the scope of the invention. Further, although the functionality for the image enhancer in the described embodiments is performed in software, it can be appreciated that the same functionality can be implemented in hardware using a digital signal processor, application specific integrated circuit, and so forth, and still fall within the scope of the invention.

What is claimed is:

1. A method for processing an image, comprising the steps of:

selecting a first area having a first value;

determining a second value for a second area surrounding said first area;

comparing said first and second values with a predetermined threshold; and transforming said first value based upon said comparison by transforming said first value using said predetermined threshold if both said first and second values are above said predetermined threshold, otherwise using an inverse of said second value.

2. The method of claim 1, wherein said first value comprises a luminance value, said second value comprises a surround value, and said predetermined threshold comprises a gray scale value.

3. The method of claim 1, wherein said predetermined threshold is represented by L/2, where L is represents a maximum plus minimum value for a luminance scale.

4. The method of claim 1, wherein said step of determining determines said second value according to the formula:

$$S(x, y) = \sum_{q=y-c}^{y+c} \sum_{p=x-c}^{x+c} Y'(p, q) * K e^{-(p*p+q*q)/(c*c/4)},$$

where c is the gaussian spread, Y'(p, q) is defined as Y'(p, q)=Y(p, q) if $\alpha Y(x,y)<=Y(p, q)<=\beta Y(x, y)$, and Y'(p, q)=Y(x, y) otherwise, and constants $\alpha$ and $\beta$ are percentage values and K is selected such that:

$$\int\int K e^{-(p*p+q*q)/(c*c/4)} dx dy = 1.$$

5. An apparatus for processing an image, said image comprising a plurality of pixels, said apparatus comprising:

an image transformer, said image transformer receives the image and assigns a first luminance value for each pixel in the image;

an image enhancer coupled to said image transformer, said image enhancer receives the image and transforms said first luminance value for at least one pixel to a second luminance value based on a set of surrounding pixels for said at least one pixel and a predetermined value wherein said first luminance value is transformed by said predetermined threshold if both said first and second values are above said predetermined threshold, otherwise said first luminance value is transformed using an inverse of said second value.

6. A machine readable medium whose contents cause a computer system to perform image processing by performing the steps of:

selecting a first area having a first value;

determining a second value for a second area surrounding said first area;

comparing said first and second values with a predetermined threshold; and transforming said first value based upon said comparison by transforming said first value using said predetermined threshold if both said first and second values are above said predetermined threshold, otherwise using an inverse of said second value.

7. The machine readable medium of claim 6, wherein said first value is a luminance value, said second value is a surround value, and said predetermined threshold is a gray scale value.

8. The machine readable medium of claim 6, wherein said predetermined threshold is represented by L/2, where L represents a maximum plus minimum value for a luminance scale.

9. The computer readable medium of claim 8, wherein said step of determining determines said second value according to the formula:

$$S(x, y) = \sum_{q=y-c}^{y+c} \sum_{p=x-c}^{x+c} Y'(p, q) * K e^{-(p*p+q*q)/(c*c/4)},$$

where c is the gaussian spread, Y'(p, q) is defined as Y'(p, q)=Y(p, q) if $\alpha Y(x,y)<=Y(p, q)<=\beta Y(x, y)$, and Y'(p, q)=Y(x, y) otherwise, and constants $\alpha$ and $\beta$ are percentage values and K is selected such that:

$$\int\int Ke^{-(p*p+q*q)/(c*c/4)}dxdy = 1.$$

10. A method for processing a digital image having pixels, comprising the steps of:

capturing and digitizing said digital image;

selecting a first area of pixels having a first luminance value;

determining a second luminance value for a second area of pixels surrounding said first area;

comparing said first and second luminance values with a predetermined threshold; and enhancing said first luminance value based upon said comparison by transforming said first value using said predetermined threshold if both said first and second values are above said predetermined threshold, otherwise using an inverse of said second value.

11. The method of claim 10, wherein said determining step includes computing a surround value for said second area of pixels.

* * * * *